United States Patent
Casagrande et al.

(10) Patent No.: US 11,805,424 B2
(45) Date of Patent: Oct. 31, 2023

(54) SYSTEM AND METHOD FOR WIRELESS EQUIPMENT DEPLOYMENT

(71) Applicant: Verizon Patent and Licensing Inc., Basking Ridge, NJ (US)

(72) Inventors: Gary Casagrande, Bridgewater, NJ (US); Neal Bharat Shah, East Brunswick, NJ (US); Jeremy McKay, Bridgewater, CO (US); Jared David Barnes, Denver, CO (US); Hannah Nicole Aldeborgh, Wheat Ridge, CO (US); Nicholas Sean Escanilla, Broomfield, CO (US); John Marco Panettiere, Schnecksville, PA (US); Tim KuanCheng Hou, Denver, CO (US); Matthew Clayton Virlee, Denver, CO (US); Kimberly Anne Berls, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 17/337,037

(22) Filed: Jun. 2, 2021

(65) Prior Publication Data
US 2022/0394495 A1 Dec. 8, 2022

(51) Int. Cl.
*G06T 7/10* (2017.01)
*H04W 16/20* (2009.01)
*H04B 17/391* (2015.01)

(52) U.S. Cl.
CPC ............... *H04W 16/20* (2013.01); *G06T 7/10* (2017.01); *H04B 17/3912* (2015.01); *H04B 17/3913* (2015.01); *G06T 2207/30184* (2013.01)

(58) Field of Classification Search
CPC ................................. H04W 16/20; G06T 7/10
See application file for complete search history.

(56) References Cited

U.S. PATENT DOCUMENTS

| | | | |
|---|---|---|---|
| 9,588,516 B1* | 3/2017 | Gurel | B64C 39/024 |
| 2019/0206105 A1* | 7/2019 | Martin | G06T 11/60 |
| 2020/0104748 A1* | 4/2020 | Zucker | G06F 16/58 |

* cited by examiner

*Primary Examiner* — Michael T Vu

(57) ABSTRACT

One or more systems and methods for wireless equipment deployment are provided herein. Imagery of locations depicting structures within a list of structures is analyzed to identify features of the structures within the locations. Ranks may be calculated for the structures based upon structure scores and installation scores calculated from the features. In response to a rank for a structure exceeding a threshold, wireless equipment deployment of a communication device may be triggered so that the communication device is controlled to exchange communication signals with devices proximate the structure.

20 Claims, 12 Drawing Sheets

SYSTEM AND METHOD FOR WIRELESS EQUIPMENT DEPLOYMENT

BACKGROUND

Many devices may be configured to connect over a network to services and/or other devices. For example, cell phones, smart watches, tablets, wearable devices, televisions, vehicle computers, and/or a wide variety of other devices may be capable of connecting to a wireless network in order to access a variety of services such as a telephony service, a website, an email service, a media streaming service, etc. In order to connect to the wireless network, the device must be able to send and receive communication signals with one or more communication devices associated with the wireless network, such as a cellular tower, a base station, a transmission device, a repeater, etc. If the device is unable to establish a reliable connection for transmitting and receiving communication signals, then the device may be unable to communicate over the wireless network.

Certain types of communication networks, such as an LTE network, may utilize radio waves or radio frequency (RF) energy to transmit and receive voice calls and data. These types of communication signals have RF propagation characteristics of being able to transmit for miles and may easily penetrate buildings, walls, or other structures. Other types of communication networks, such as a 5G network, may utilize communication signals that have different propagation characteristics. For example, 5G may provide faster communication than LTE, but 5G communication signals may be of different frequencies and may not propagate as well as those frequencies used for LTE. This may make it difficult for devices within buildings or other structures to communicate over higher frequencies. Thus, certain types of communication devices and equipment, such as repeaters or antennas, may be used to help propagate these types of communication signals into buildings or other structures.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
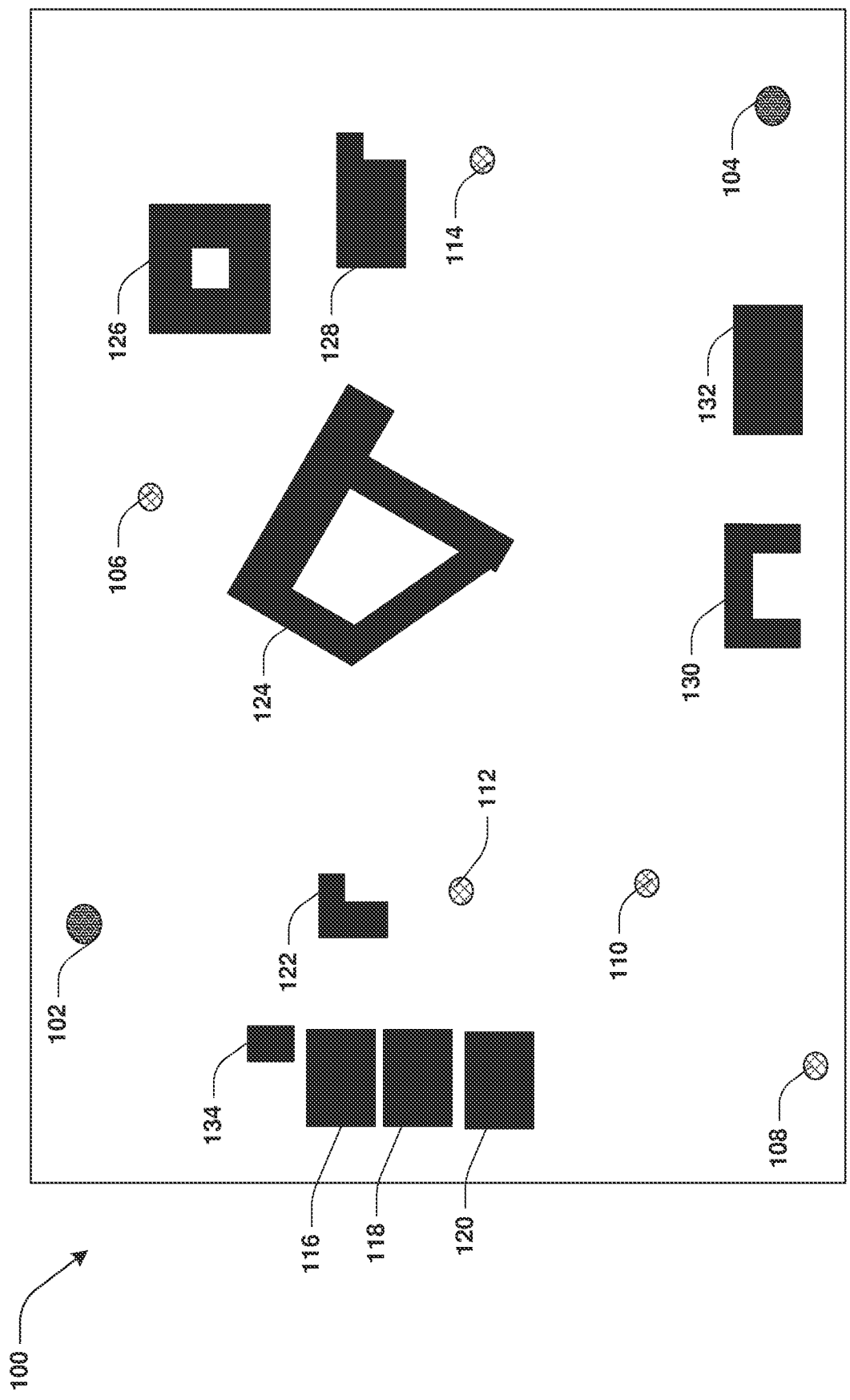
FIG. 1 is a diagram illustrating an example scenario associated with equipment deployment.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for equipment deployment are provided. A communication provider of a communication network may utilize various types of communication devices, such as wireless equipment, for transmitting and receiving communication signals from devices. For example, a wireless communication provider may deploy cellular towers, antennas, base stations such as gNodeB base stations, repeaters, and/or a variety of other communication devices in order to provide devices (e.g., a phone, a tablet, a smart watch, a vehicle computer, etc.) with connectivity over the communication network. Different types of communication networks may have different characteristics, such as data transfer speeds, frequencies, propagation characteristics such as signal travel distances and the ability to penetrate walls or other structures, reliability, etc. For example, certain communication networks may utilize frequencies that propagate long distances and are ideal for penetrating buildings so that communication devices within the builds can connect to and communicate over these communication networks. Other types of communication networks may provide faster broadband communication, but may utilize frequencies that do not propagate as far and do not easily penetrate buildings. Repeaters and/or other communication devices may be installed near buildings in order to help exchange communication signals with devices located with the buildings.

Certain types of communication devices such as antennas may be costly, and installation of these types of communication devices may require extensive time and manual effort by technicians to determine where and how to install these communication devices. Also, there could be a large number of buildings (e.g., tens of thousands of buildings within a region such as a city) that may be candidates for installation of communication devices for use in facilitating communication with devices located within such buildings. It is not practical for humans to manually go to each building and evaluate whether each building would be a good candidate for installation of a communication device such as a 5G repeater, a 5G ultra-wideband transmission device, etc. A good candidate may be a building with a large number of windows through which communication signals can easily pass and with simply geometry such that a communication device could easily be installed and oriented with a line of sight into the building through the windows. This building may be located near an installation structure such as a telephone pole that has available space for mounting the communication device and is located nearby a base station. Manually performing this evaluation to identify good candidate buildings is impractical.

Accordingly, as provided herein, equipment deployment is implemented. In an embodiment, the equipment deployment may be implemented by an equipment deployment component. The equipment deployment component may be implemented as hardware (e.g., a server, a computing device, a dedicated hardware device tailored to deploying and controller communication devices, etc.), software, or combination thereof. The equipment deployment component is configured to programmatically evaluate candidate structures to identify one or more structures for which devices within the one or more structures will have the highest probabilities of establishing successful communication with communication devices deployed proximate the one or more structures. For these candidate structures, installation of the communication device may improve communication for devices located within the structures.

In an embodiment, the equipment deployment component is configured to evaluate imagery, of locations depicting structures within a list of structures, to identify features of the structures within the locations. In an example, the features may correspond to a window to building material feature (e.g., a ratio of window surface area to non-window surface area of a building), a structure complexity score feature (e.g., a ratio of surface area of a convex hull encompassing a building to a footprint surface area of a footprint of the structure), installation features of an installation structure (e.g., available surface area of a telephone pole upon which a repeater can be installed), a line of sight score feature (e.g., how much of an unobstructed view is there from a telephone pole to the inside a building), and/or a variety of other features.

The features are evaluated to calculate scores that are used to rank the structures. For example, a structure score for a structure is calculated based upon a window to building material feature of the structure and/or based upon a geometric complexity of the structure derived from geometric features of the structure. The more window surface area and/or the more simple the geometry of a building, the higher the probability that a communication device such as a repeater can exchange signals with devices within the building, and thus the higher the structure score. In this way, the structure score for the structure is indicative of how easily a communication device deployed proximate the structure can successfully communicate with devices within the structure. Accordingly, a rank for the structure is calculated based upon the structure score.

The rank for the structure may also be calculated based upon installation scores calculated for installation structures within a threshold proximity to the structure (e.g., telephone poles within a wireless communication range of the building, such as within a high frequency communication range of 5G). An installation score for an installation structure may be calculated based upon a proximity of the installation structure to the structure. The closer the installation structure is to the structure, the higher the probability that a communication device such as a repeater installed upon the installation structure can exchange signals with devices within the structure, and thus the higher the installation score. The installation score may also be calculated based installation structure features indicative of an ability to install a communication device upon the installation structure (e.g., an amount of free surface area for mounting a repeater, whether a street light, high voltage wires, or other objects would hinder the ability to install the repeater, etc.). The easier the ability to install a communication device upon the installation structure, the higher the installation score.

Once the ranks have been calculated for the structures within the list of structures, the ranks may be evaluated to identify structures with ranks exceeding a threshold (e.g., a number of highest ranked structures). In an embodiment, in response to a rank of a structure exceeding the threshold, deployment and/or dispatch of the communication device for exchanging communication signals with devices proximate the structure may be triggered. In an example, the communication device may be packaged, shipped, and/or installed upon an installation structure. In an example, the equipment deployment component may control a machine to package the communication device for shipping. In an example, the equipment deployment component may control a machine to prepare and/or load the communication device into a vehicle for install by a user such as a technician. In an example, the equipment deployment component may control a drone to deliver and/or install the communication device. In an example, the equipment deployment component may deploy a vehicle such as a drone or truck with communications equipment installed to act as the communication device. In an example, the equipment deployment component may enable an antenna beam of a previously installed communication device that may provide wireless service. In an example, if the communication device has been installed on the installation structure, then the communication device may be controlled (e.g., wirelessly controlled over a network by sending control instructions over the network to the communication device to control the communication device) by the equipment deployment component to exchange communication signals with devices proximate the structure based upon the rank exceeding the threshold.

FIG. 1 illustrates an example of a location 100 comprising a plurality of structures. In an example, the location 100 may be a parcel or any other region within which the plurality of structures are located. A first structure 116, a second structure 118, a third structure 120, a fourth structure 134, and a fifth structure 122 within the location 100 may be located near one another. A fifth structure 130 and a sixth structure 132 within the location 100 may be located near one another. A seventh structure 124, an eighth structure 126, and a ninth structure 128 within the location 100 may be located near one another. A first base station 102 and a second base station 104, such as gNodeB base stations, may be located within the location 100. One or more installation structures, such as poles, buildings, or other objects upon which communication devices may be mounted/attached, may be located within the location 100. For example, a first installation structure 106, a second installation structure 108, a third installation structure 110, a fourth installation structure 112, and a fifth installation structure 114 may be located within the location 100.

Certain structures within the location 100 may be better candidates than other structures within the location 100 for installation of communication devices (e.g., repeaters, antennas, communication transmission devices, etc.) that are configured to exchange communication signals with devices (e.g., user phones, tablets, smart devices, etc.) located within the structures. The ability for a communication device to exchange communication signals with devices located within the structures may be based upon a variety of factors. In an example, a geometric complexity of a structure may affect how easily a communication device can transmit communication signals into the structure and receive communication signals from devices within the structure. The more complex the structure (e.g., a lot of corners, non-uniform or non-geometric shape, non-uniform fascia, a structure face with more building material than windows, an interior courtyard, etc.), the more difficult it may be for the communication device to exchange communication signals with devices within the structure.

In another example, installation structure features and proximity of installation structures to a structure may affect how easily a communication device, installed on the installation structures, can transmit communication signals into the structure and receive communication signals from devices within the structure. If there are no nearby available installation structures with adequate surface area upon which a communication device can be easily installed, then installation of the communication device for the structure in a manner where the communication device can exchange communication signals with devices within the structure may be difficult. In another example, a proximity of an installation structure to a base station may affect an ability of a communication device installed on the installation structure to provide devices within the structure with connectivity to a communication network accessible through the base station. If there are no base stations nearby installation structures proximate the structure, then communication devices installed on the installation structures may be unable to establish a connection to the communication network to which the communication device is to connect devices inside the structure.

A variety of other factors may affect how easily and effectively an installed communication device will improve the ability for devices within structures to connect to and communicate over a communication network. Because of these factors and because there may be significant number of candidate structures (e.g., tens of thousands of candidate structures), it may be impractical to manually determine which structures are good candidates for deployment of communication devices to improve connectivity of devices within the structures to a communication network, such as a 5G network. Accordingly, the equipment deployment component is capable of programmatically identifying features associated with the factors, calculating ranks for the structures based upon the features, and dispatching, deploying, and/or controlling communication devices to exchange communication signals with devices proximate structures having ranks above a threshold.

Figure 2:
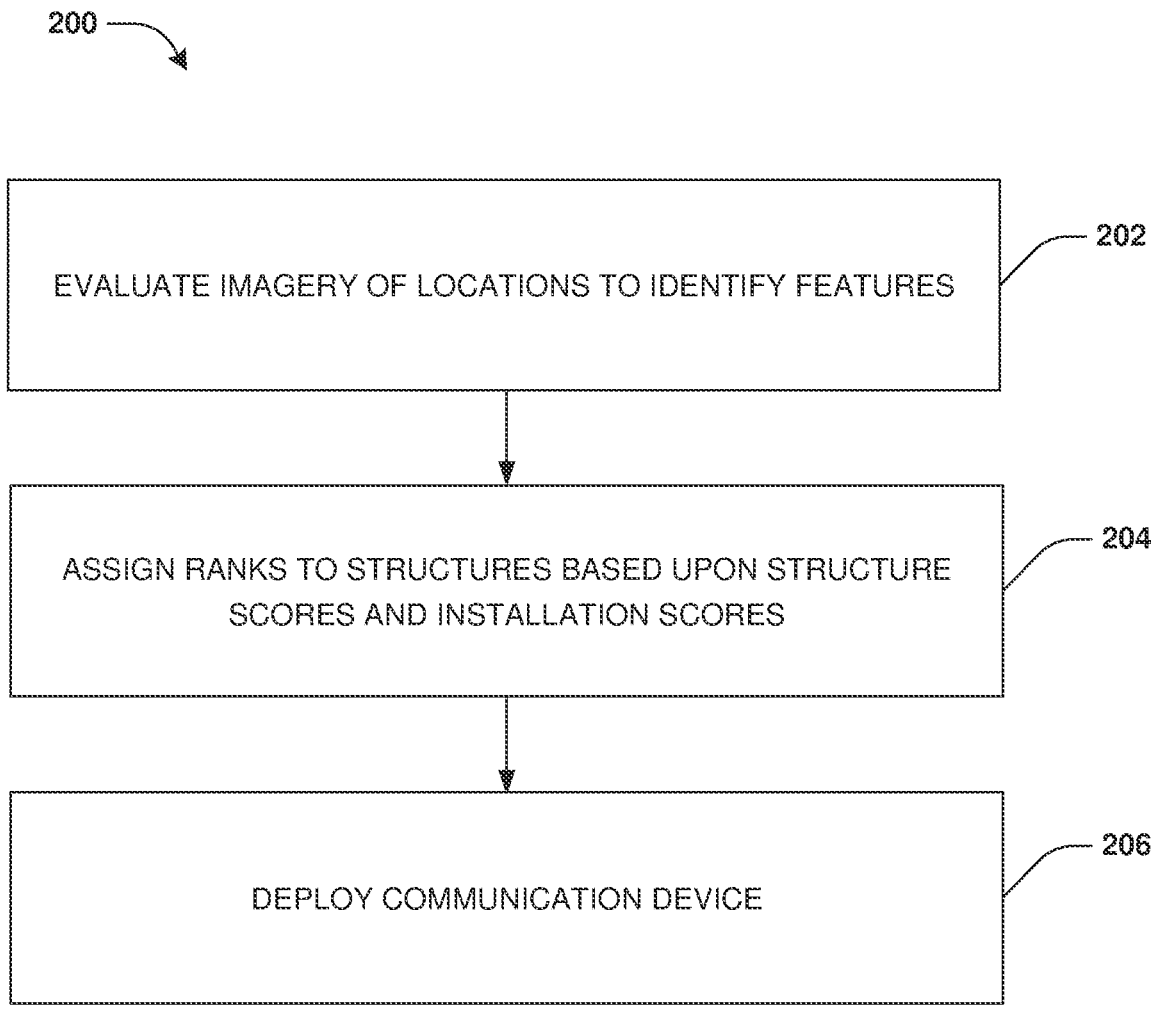
FIG. 2 is a flow chart illustrating an example method for equipment deployment.
Figure 3:
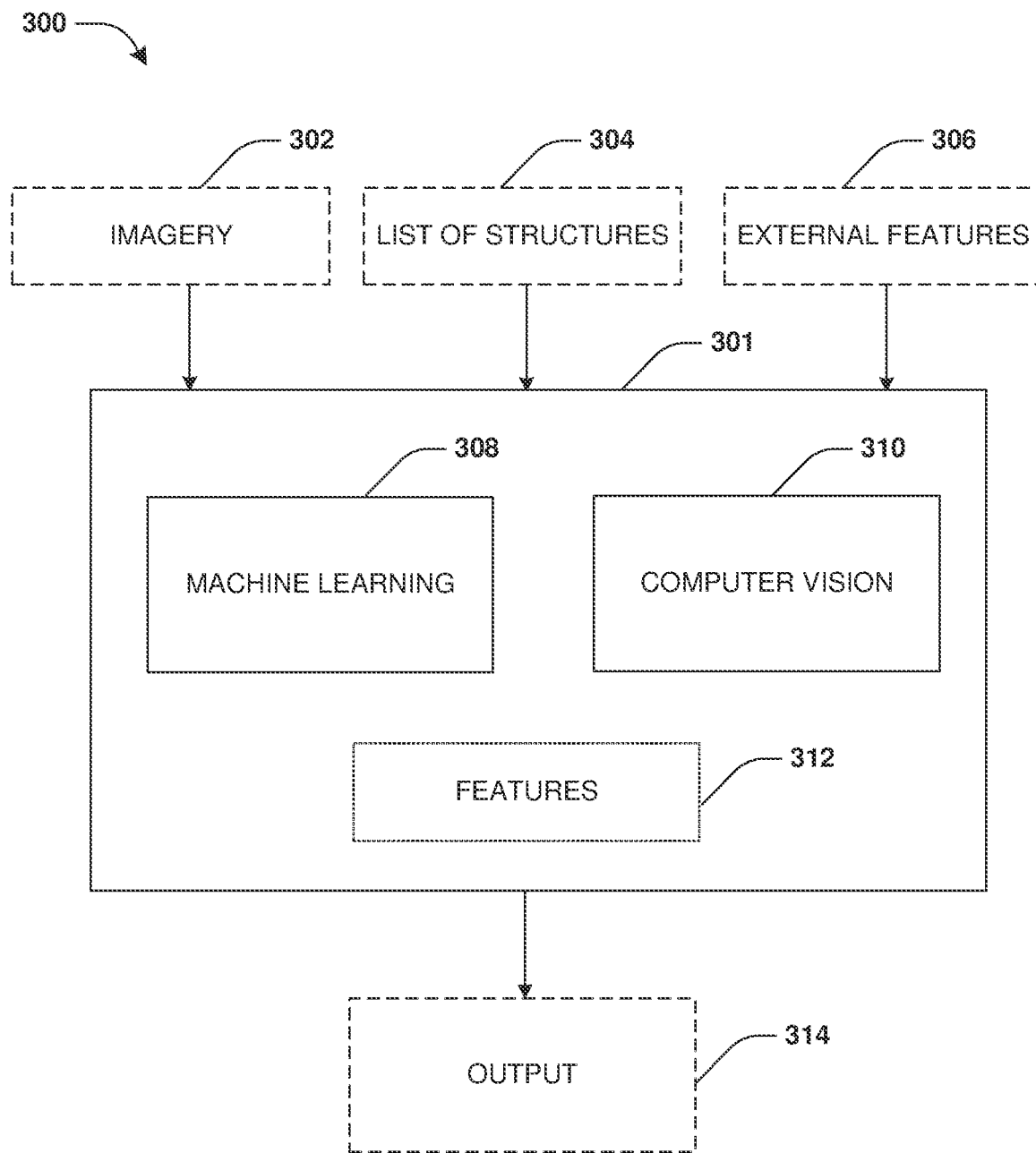
FIG. 3 is a diagram illustrating an example scenario associated with equipment deployment.

One embodiment of equipment deployment is illustrated by an exemplary method 200 of FIG. 2 and is further described in conjunction with system 300 of FIG. 3. The system 300 may comprise an equipment deployment component 301 that may be implemented through hardware, software, and/or combination thereof. The equipment deployment component 301 may identify a list of structures 304, such as buildings or any other type of physical structure, that are to be ranked in order to identify a subset of structures for which the equipment deployment component 301 may deploy and/or control communication devices. In an example, the list of structures 304 may be input by a user or application. In another example, the list of structures 304 may be programmatically identified by the equipment deployment component 301 based upon the list of structures 304 being located within a particular location or region (e.g., identification of buildings within a city for which communication devices are to be installed).

In an example, a first structure may be a better candidate than a second structure if there is a higher probability that a communication device such as a repeater or other communication transmission device will improve the ability for devices (e.g., phones, computing devices, smart devices, watches, televisions, etc.) within the first structure to connect to and communicate over a communication network such as a 5G network. In an example, the first structure may be the better candidate than the second structure if a time to deploy/install the communication device for the first structure is less than a time to deploy/install the communication device for the second structure. In an example, the first structure may be the better candidate than the second structure if a cost to deploy/install the communication device for the first structure is less than a cost to deploy/install the communication device for the second structure. In an example, the first structure may be the better candidate than the second structure if there is a greater number of devices within the first structure (e.g., an apartment building) that will benefit from the communication device than the second structure (e.g., a single family home).

The equipment deployment component 301 may identify the locations at which the structures within the list of structures 304 are located. In an example, the locations may be specified within the list of structures 304 such as where zip codes, addresses, global position system (GPS) data, and/or longitude and latitude coordinates are specified for the structures within the list of structures 304. In an example, the locations may correspond to a zip code of a city within which the list of structures 304 are located. The equipment deployment component 301 may retrieve imagery 302 (e.g., street side imagery, satellite imagery, etc.) from an image repository based upon the imagery 302 depicting the locations.

During operation 202 of method 200, the equipment deployment component 301 may evaluate the imagery 302 to determine a set of features 312 of the structures and objects (e.g., a statue, a courtyard, an installation structure such as a pole, a fountain, or any other physical object) identified within the locations depicted by the imagery 302. The equipment deployment component 301 may evaluate the imagery 302 utilizing customized machine learning functionality 308, customized computer vision functionality 310, and/or other customize functionality that is customized to identify geometric features, installation structure features, and/or other features that are used to calculate structure scores and installation scores using customized scoring and ranking functionality for ranking structures.

Figure 4:
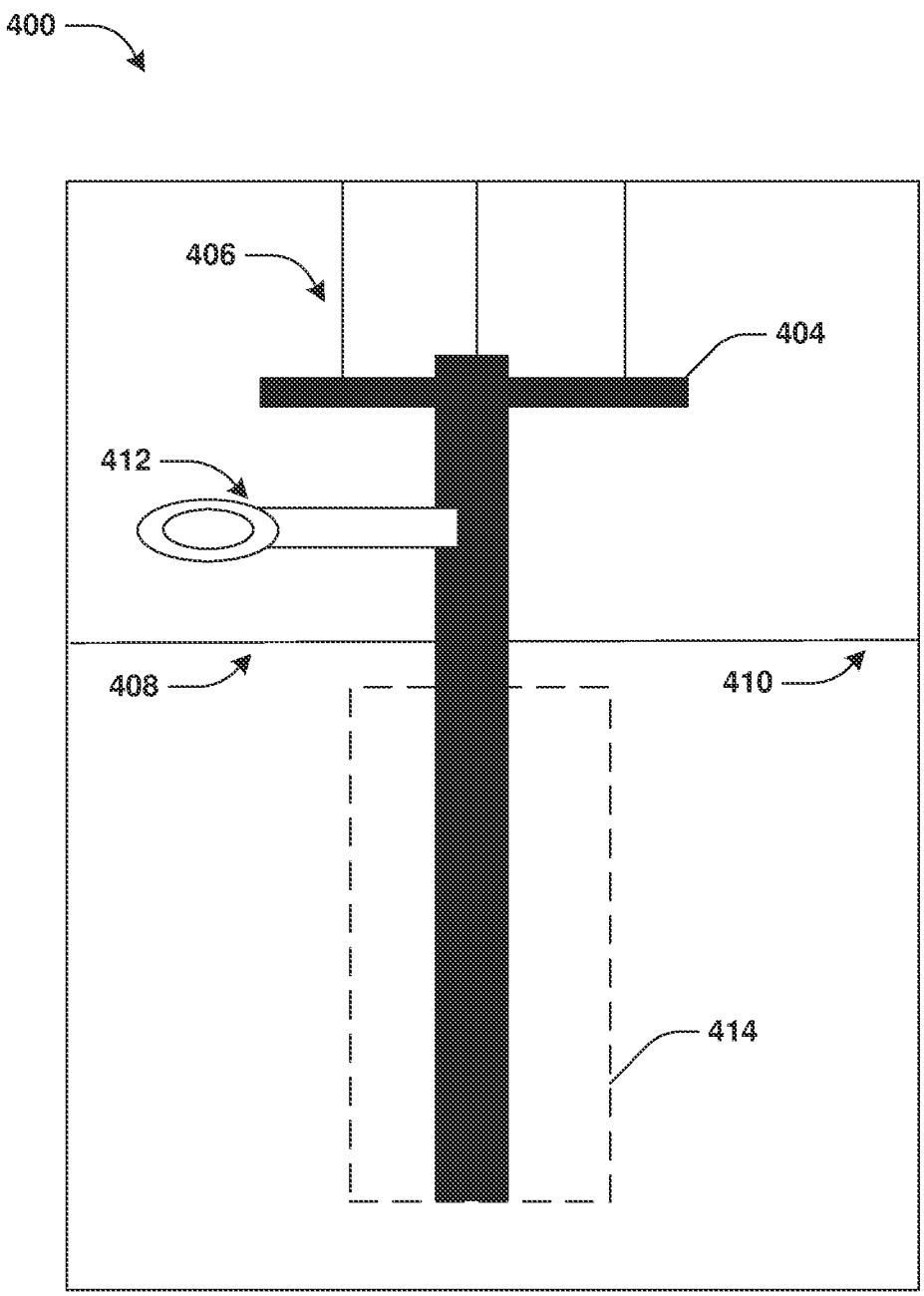
FIG. 4 is a diagram illustrating an example scenario associated with equipment deployment, where features of a pole are identified.

In an example of determining the set of features 312, an object depicted within an image of the imagery 302 may be identified by the machine learning functionality 308 and/or the computer vision functionality 310 as an installation structure 400 such as a telephone pole, as illustrated by FIG. 4. The equipment deployment component 301 may analyze the image using the machine learning functionality 308 and/or the computer vision functionality 310 to identify installation structure features of the installation structure 400 for inclusion within the set of features 312. The installation structure features may correspond to an ability to install a communication device upon the installation structure 400. The installation structure features may comprise a height of the installation structure 400, a material type of the installation structure 400, high voltage wires 406, 408, and 410 proximate the installation structure 400, and free space 414 on the installation structure 400 where a communication device could be installed.

The installation structure features may also comprise a shape of the installation structure 400, such as where the telephone pole has a crossbar 404. The installation structure features may also correspond to attached objects that are attached to the installation structure 400, such as a light 412. The installation structure features may also comprise a first line of sight from the installation structure 400 to a base station or other communication device such as an antenna or cellular tower. The installation structure features may also comprise a second line of sight from the installation structure 400 to a structure face of the structure (e.g., a line of sight to a side of a building). The installation structure features and/or proximity of the installation structure 400 to a structure may be used to calculate an installation score for the installation structure 400 in relation to the structure.

Figure 5:
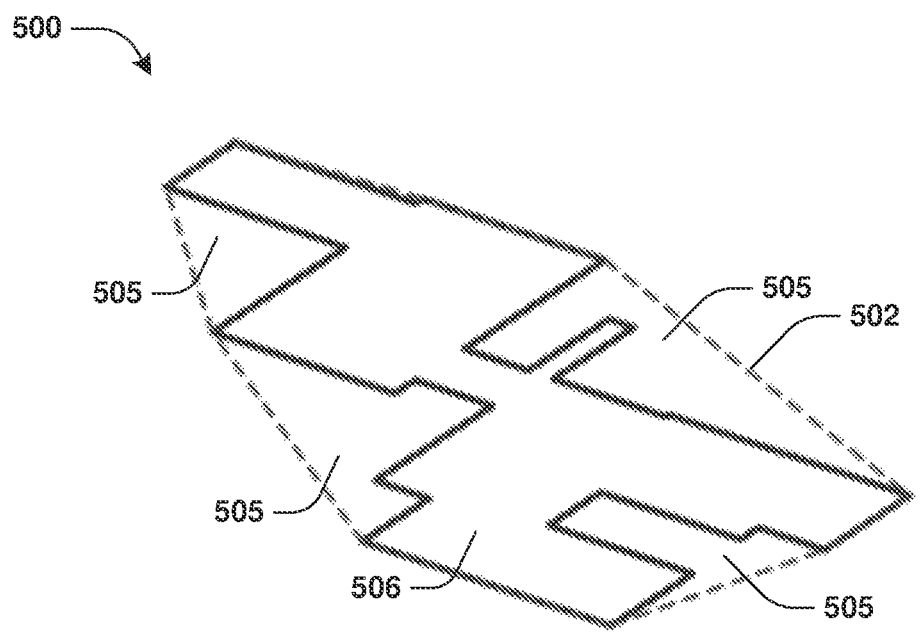
FIG. 5 is a diagram illustrating an example scenario associated with equipment deployment, where features of a building and a parcel are identified.
Figure 5:
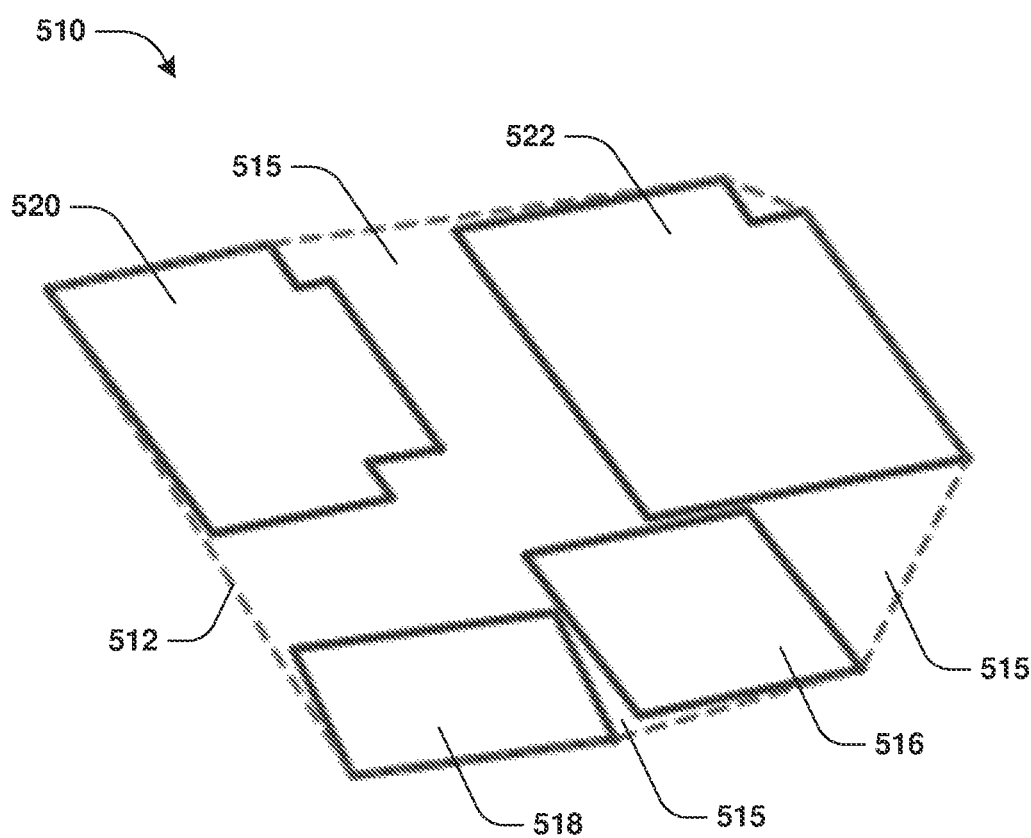

In an example of determining the set of features 312, the equipment deployment component 301 may be configured to determine a structure complexity score feature, for a structure 500, for inclusion within the set of features 312, as illustrated by FIG. 5. The structure complexity score may be based upon a ratio of a surface area 505 of a convex hull 502 encompassing the structure 500 to a footprint surface area of a footprint 506 of the structure 500. The larger the ratio, the less complex the structure 500. The less complex the structure 500, the higher the probability that a communication device will be able to exchange communication signals with devices within the structure 500. The structure complexity score feature may be modified based upon various factors, such as a fascia size of the structure 500, a number of corners of the structure 500 (e.g., the more corners, the more complex), a number of structure faces of the structure 500 lacking windows (e.g., communication signals may probably more easily through windows), an interior ring surface area (e.g., a surface area of an inner courtyard) of the structure 500, etc. The structure complexity score feature corresponds to geometric features of the structure 500 that may be used to calculate a geometric complexity for the structure 500. The geometric complexity of the structure 500 and/or a window to building material feature of the structure 500 (e.g., a ratio of window surface area to non-window surface area of the structure 500) may be used to calculate a structure score for the structure.

In an example of determining the set of features 312, the equipment deployment component 301 may be configured to determine a parcel complexity score feature for a parcel 510 for inclusion within the set of features 312, as illustrated by FIG. 5. The parcel 510 may comprise a first structure 516, a second structure 518, a third structure 520, and a fourth structure 522. In an example, the parcel complexity score feature may be determined based upon structure complexity score features of the structures within the parcel 510, such as structure complexity score features of the first structure 516, the second structure 518, the third structure 520, and the fourth structure 522. In an example, the parcel complexity score feature may be determined based upon a density of structures within the parcel 510, which may be based upon a ratio of a surface area 515 of a convex hull 512 encompassing the parcel 510 to a footprint surface area of footprints of the first structure 516, the second structure 518, the third structure 520, and the fourth structure 522. In an example, the parcel complexity score feature may be determined based upon a number of structures within the parcel 510, such as where the more structures, the more complex the parcel 510. The less complex the parcel 510, the higher the probability that a communication device will be able to exchange communication signals with devices within at least one of the first structure 516, the second structure 518, the third structure 520, and the fourth structure 522 within the parcel 510.

Figure 6:
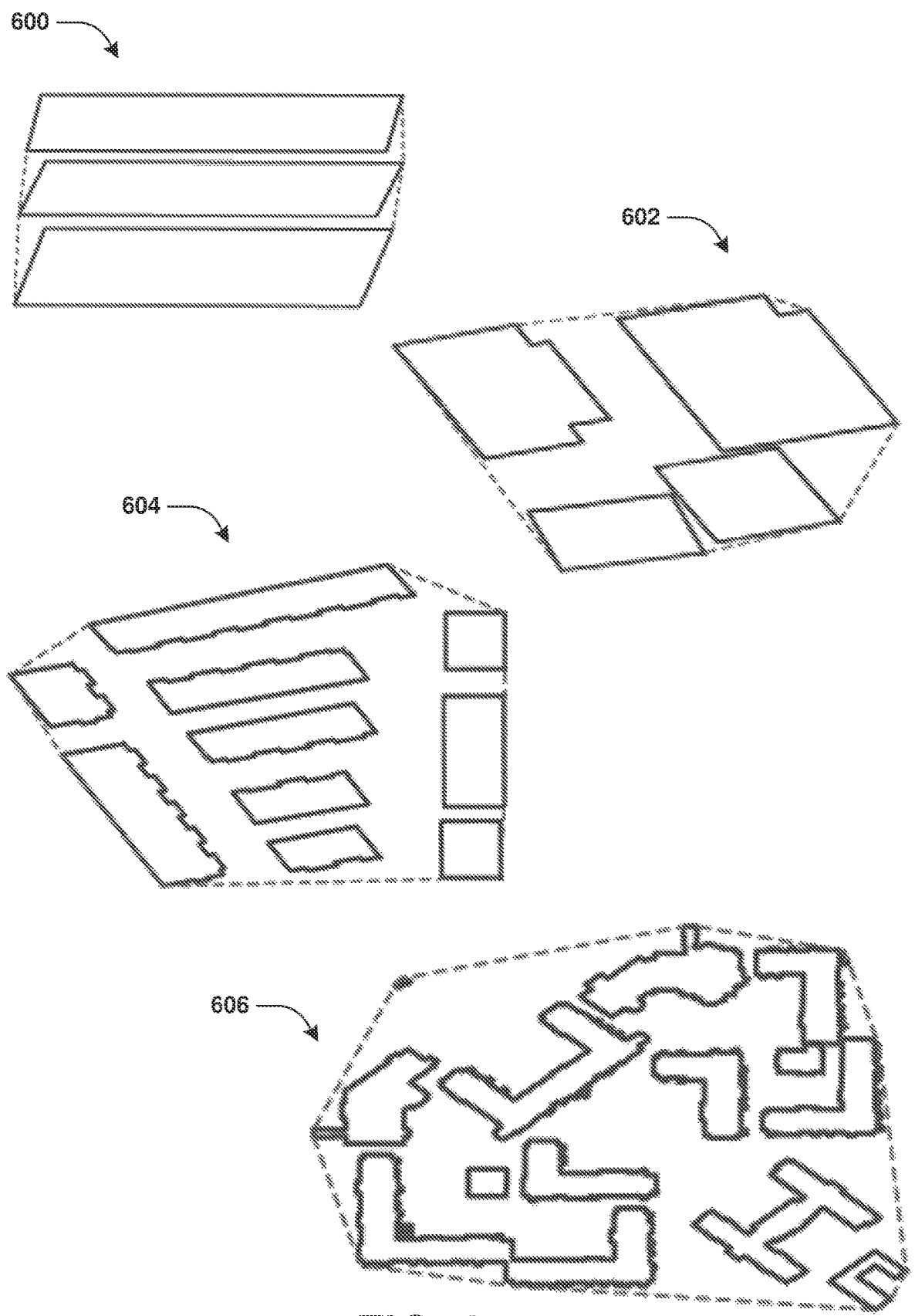
FIG. 6 is a diagram illustrating an example scenario associated with equipment deployment, where different parcels have differing complexities.

FIG. 6 illustrates different parcels with varying parcel complexity score features. The smaller a parcel complexity score feature, the higher the probability that a communication device will be able to exchange communication signals with devices inside structures within the parcel. In an example, a first parcel 600 may have a relatively smaller parcel complexity score feature due to the relatively simple geometry of structures within the first parcel 600, a relatively high density of structures within the first parcel 600, and/or a relatively smaller number of structures within the first parcel 600. A second parcel 602 may have a larger parcel complexity score feature than the first parcel 600 due to the structures within the second parcel 602 having more complex geometry, a relatively lower density of structures within the second parcel 602, and/or a relatively larger number of structures within the second parcel 602.

A third parcel 604 may have a larger parcel complexity score feature than the first parcel 600 and the second parcel 602 due to the structures within the third parcel 604 having more complex geometry, a relatively lower density of structures within the third parcel 604, and/or a relatively larger number of structures within the third parcel 604. A fourth parcel 606 may have a larger parcel complexity score feature than the first parcel 600, the second parcel 602, and/or the third parcel 604 due to the structures within the fourth parcel 606 having more complex geometry, a relatively lower density of structures within the fourth parcel 606, and/or a relatively larger number of structures within the fourth parcel 606.

Figure 7:
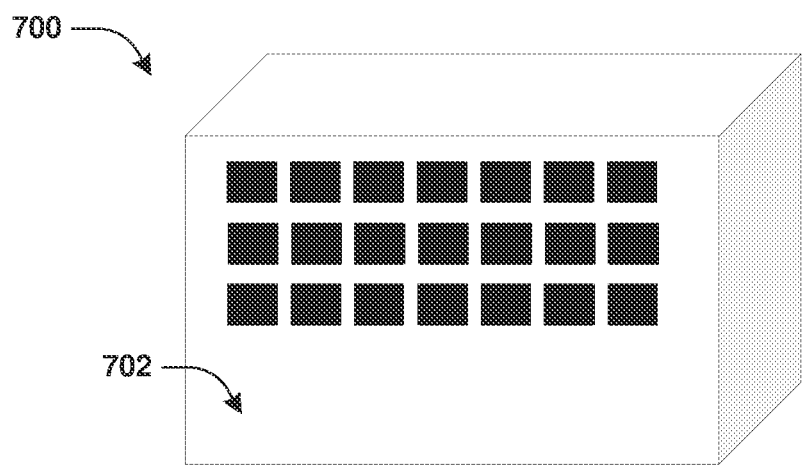
FIG. 7 is a diagram illustrating an example scenario associated with equipment deployment, where different buildings have different characteristics.
Figure 7:
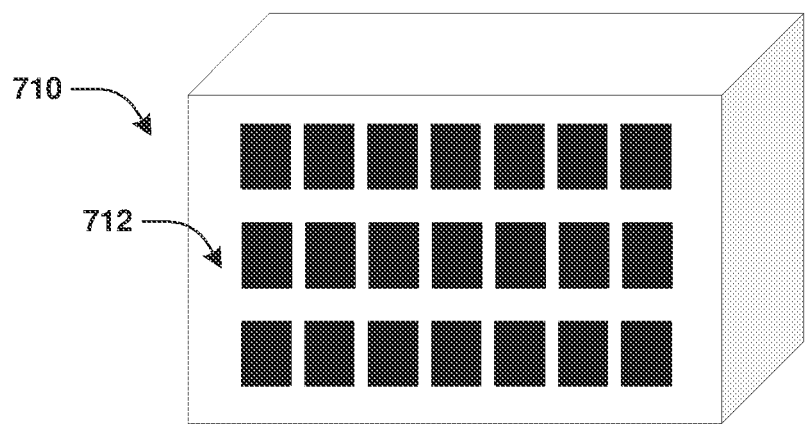

In an example of determining the set of features 312, the equipment deployment component 301 may be configured to determine structure face score features for structures within the list of structures 304 for inclusion within the set of features 312. For example, a first structure face score feature may be determined for a first structure 700 and a second structure face score feature may be determined for the second structure 710, as illustrated by FIG. 7.

In order to determine a structure face score feature, the equipment deployment component 301 may determine a window to structure material ratio for a structure face of a structure. The window to structure material ratio may be determined based upon a ratio of window surface area to non-window surface area of the structure face of the structure. The larger the window to structure material ratio, the more window surface area of the structure face. The more window surface area of the structure face, the easier communication signals may penetrate into the structure because communication signals may penetrate through windows more easily than building material (e.g., brick, wood, etc.). In this way, a structure face 702 of the first structure 700 will have a smaller window to structure material ratio than a structure face 712 of the second structure 710 that has a large ratio of window surface area compared to the structure face 702 of the first structure 700. A structure face score feature may be determined based upon the window to structure material ratio and/or a structure complexity score feature for the structure derived from a ratio of a surface area of a convex hull encompassing the structure to a footprint surface area of the a footprint of the structure.

Figure 8:
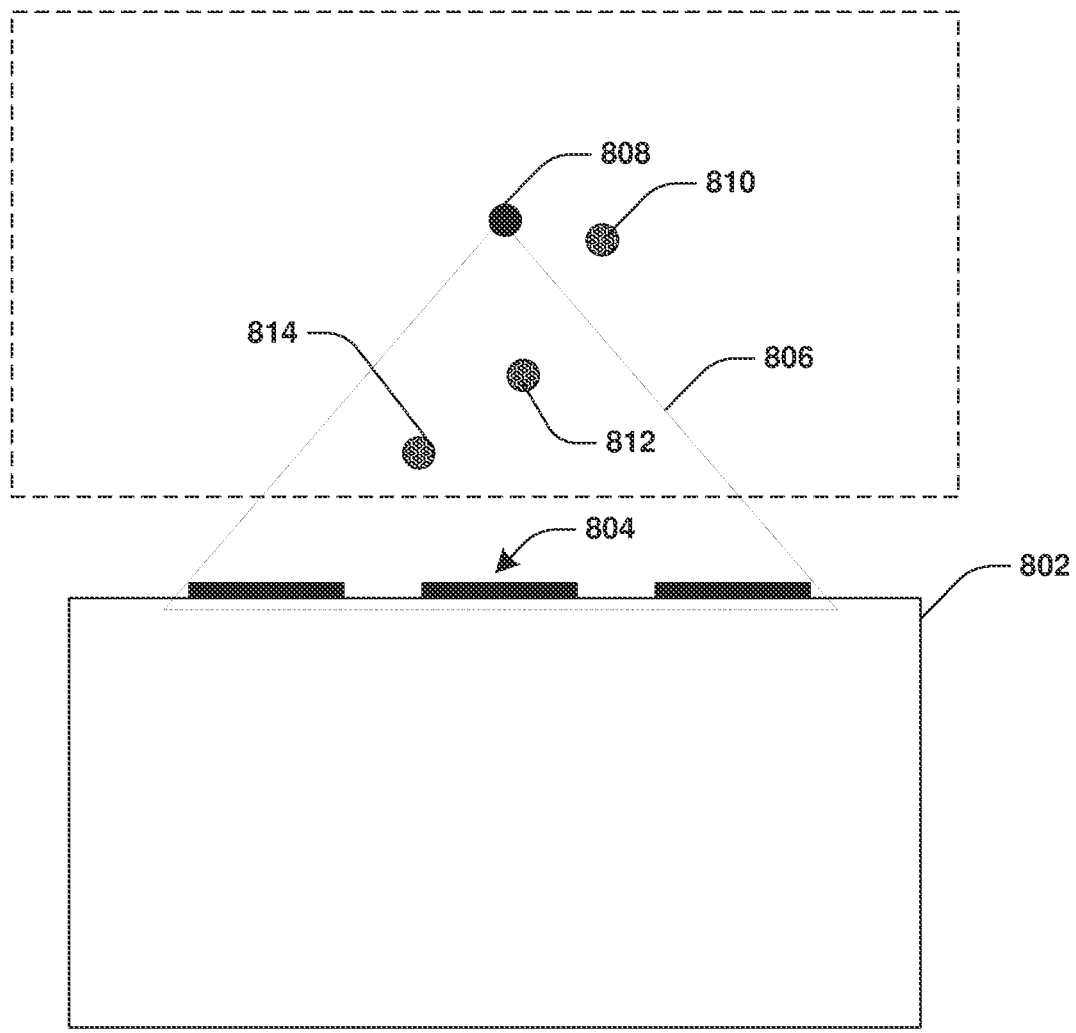
FIG. 8 is a diagram illustrating an example scenario associated with equipment deployment, where features are derived from area of signal incidence information.

In an example of determining the set of features 312, the equipment deployment component 301 may be configured to determine installation features for installation structures within an area of signal incidence 806, as illustrated by FIG. 8. For example, a first installation structure 810, a second installation structure 812, and a third installation structure 814 may be located relative to a structure face 804 of a structure 802. The equipment deployment component 301 may evaluate imagery depicting an area around the structure 802 in order to determine the area of signal incidence 806 for the structure face 804 of the structure 802. The area of signal incidence 806 may correspond to a minimum and maximum distance from the structure face 804 in order to achieve a particular percentage of coverage of the structure face 804 (e.g., 100% coverage or any other percentage). A point 808 within the area of signal incidence 806 that provides a threshold amount of signal coverage for the structure face 804 of the structure 802 (e.g., 100% coverage or any other percentage) may be determined. Installation features may be assigned to the first installation structure 810, the second installation structure 812, and/or the third installation structure 814 based upon proximity of the installation structures to the point 808. The closer an installation structure is to the point 808, the larger the installation feature. The larger the installation feature, the more likely a communication device installed on the installation structure will be able to exchange communication signals, through the structure face 804, with devices within the structure 802.

Figure 9:
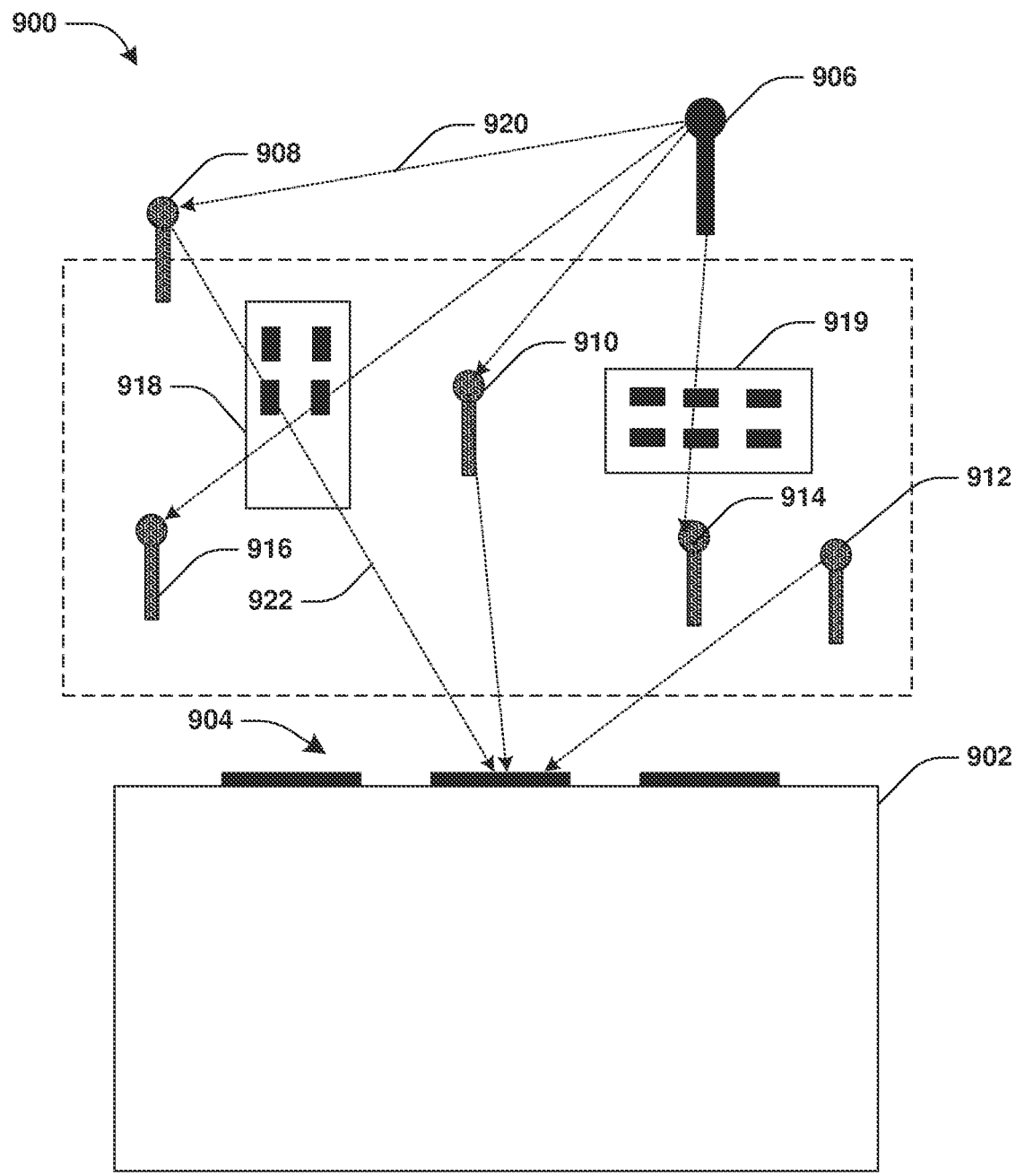
FIG. 9 is a diagram illustrating an example scenario associated with equipment deployment, where features are derived from line of sight information.

In an example of determining the set of features 312, the equipment deployment component 301 may be configured to determine line of sight score features for installation structures proximate a structure face 904 of a structure 902, as illustrated by FIG. 9. A region near the structure face 904 of the structure 902 may comprise a first installation structure 908, a second installation structure 910, a third installation structure 912, a fourth installation structure 914, a fifth installation structure 916, a first building 918, and a second building 919. A line of sight score feature may be determined for the installation structures, such as for the first installation structure 908. In order to determine the line of sight score feature for the first installation structure 908, a first line of sight 920 from a base station 906 or other communication device (e.g., an antenna, a transmission device, a gNodeB, etc.) to the first installation structure 908 may be determined. The first line of sight 920 may be an unobstructed line of sight having a particular distance between the base station 906 and the first installation structure 908. A second line of sight 922 from the first installation structure 908 to the structure face 904 of the structure 902 may be determined. The second line of sight 922 may take into account a distance from the first installation structure 908 to the structure face 904 and any obstructions such as the first building 918 and features of the obstructions (e.g., windows, building material, structure complexity, etc.). The line of sight score feature for the first installation structure 908 may be determined based upon an amount of obstruction associated with the first line of sight 920 and the second line of sight 922 and/or the distances between the first installation structure 908 and the base station 906 and between the first installation structure 908 and the structure face 904 of the structure 902.

The equipment deployment component 301 may utilize other features, such as external features 306, for inclusion within the set of features 312. The external features 306 may correspond to a base station proximity to the structure and/or an installation structure, a number of floors of the structure, a height of the structure, and/or other features.

During operation 204 of method 200, the equipment deployment component 301 may calculate ranks for the structures within the list of structures 304 based upon the set of features 312. The set of features 312 may be used to determine a rank for a structure, which corresponds to a predicted ability for a communication device, installed on an installation structure, to transmit a signal into the structure for facilitating communication with devices within the structure over the communication network. For example, the structures may be ranked based upon structure complexity score features, identified courtyards, average floor height features, installation structure proximity features, structure face score features, installation features derived from area of signal incidence information, and/or other features. The more difficult it would be for a communication device to exchange signals with devices within a structure, the lower a rank assigned to the structure.

In an embodiment of calculating a rank for a structure, a structure score for the structure is calculated by the equipment deployment component 301. The equipment deployment component 301 may calculate the structure score based upon a window to building material feature of the structure. The greater the ratio of window material to non-window material of the structure, the higher the structure score. The equipment deployment component 301 may calculate the structure score based upon a geometric complexity of the structure derived from geometric features of the structure. The geometric features may correspond to a structure complexity score feature derived from a ratio of surface area of a convex hull encompassing the structure to a footprint surface area of a footprint of the structure. The less complex the geometry of the structure, the higher the structure score. If the structure is located within a parcel, then the structure score may be calculated based upon a parcel complexity score feature for the parcel. The less complex the parcel, the higher the structure score. In this way, the structure score is used to calculate a rank for the structure.

The equipment deployment component 301 may calculate the rank for the structure based upon installation scores of installation structures within a threshold proximity to the structure. The equipment deployment component 301 may calculate an installation score for an installation structure based upon a proximity of the installation structure to the structure and/or installation structure features indicative of an ability to install a communication device upon the installation structure. The closer the installation structure to the structure and/or the easier to install a communication device upon the installation structure, the higher the installation score. The installation score may also be calculated based upon installation features corresponding to area of signal incidence information. The closer the installation structure is to a point, within an area of signal incidence, that provides a threshold amount of signal coverage to a structure face of the structure (e.g., a communication device installed at the point would provide 100% or some other percentage of signal coverage to the structure face), the higher the installation score. The installation score may also be calculated based upon a line of sight score feature. The less obstructed the lines of sight from the installation structure to a base station and/or the structure face of the structure, the higher the installation score.

The equipment deployment component 301 may calculate the rank for the structure based upon external features. For example, the external features may comprise a base station proximity to the structure, a number of floors of the structure, identified courtyards, and/or a height of the structure.

In this way, the equipment deployment component 301 may calculate the rank for the structure based upon the structure score, the installation score, and/or other features of the set of feature 312. The rank may correspond to a predicted capability for a communication device to receive and transmit communication signals into the structure.

During operation 206 of method 200, the equipment deployment component 301 may trigger deployment and/or dispatch of a communication device for exchanging communication signals with devices proximate a structure in response to a rank for the structure exceeding a threshold. For example, the equipment deployment component 301 may control equipment to package, transport, and/or install the communication device upon an installation structure. Once installed (or if previously installed but currently in a non-operational state), the equipment deployment component 301 may control the communication device to exchange communication signals with devices proximate the structure in response to the rank for the structure exceeding the threshold.

In an embodiment, the equipment deployment component 301 may generate an output 314 (e.g., an installation plan, a recommendation, instructions for install, etc.) for facilitating the installation of the communication device for one or more structures selected from the list of structures 304 based upon ranked assigned to the one or more structures (e.g., a subset of highest ranked structures). In an example, the equipment deployment component 301 may output an installation plan as the output 314. The installation plan may specify which structures are good candidates for communication device installations, what types of communication devices to install (e.g., a 5G repeater, a 5G antenna, etc.), which installation structures should be used to install communication devices, how many communication devices should be installed for a structure, an install orientation (e.g., which direction a communication device should face), an expect signal strength for devices within a structure after install, a number of devices expected to benefit from the install, an estimated time to install the communication device, an estimated cost to installed the communication device (e.g., user self-install may be much cheaper than a technician required install), etc.

In an example, the equipment deployment component 301 may output a recommendation as the output 314. The recommendation may be generated in response to receiving a request over a computer communication network from a remote computer for the recommendation, such as a request input by a user through a website through which users may obtain recommendations as to whether a structure would benefit from the installation of a communication device. For example, a user may input an address of a target structure (e.g., a home address of a home of the user) through the website in order to determine whether it would be beneficial to have a communication device installed for the target structure. The recommendation may be transmitted over the computer communication network to the remote computer for display through a user interface, such as through the website, through a text message, through an email, through an app, etc. The recommendation may be populated with information relating to a predicted level of communication service capable of being provided to devices within the target structure (e.g., an expected connectivity speed and/or signal strength if a 5G repeater was installed for the home). This information may be derived from a rank assigned to the target structure and/or from features associated with the target structure and/or nearby objects (e.g., installation structures, base stations, obstructions, etc.).

In an example, the recommendation may be populated with an indication that the communication device is capable of self-install by the user (e.g., the user may be able to mount the communication device to the home). The recommendation may provide an interface through which the user may request the communication device be shipped to the user for install. In an example, the recommendation may be populated with an indication that the communication device is to be installed by a technician (e.g., the communication device is to be installed on a telephone pole). The recommendation may provide an interface through which the user may request install of the communication device. In an example, the recommendation is populated with installation instructions for the communication device. The installation instructions may comprise an install location, an install orientation for the communication device, a guide used to guide an installer (e.g., the user or a technician receiving the recommendation through a user device) through an installation process to install the communication device. The visual guide may comprise images of the install location, an image of the communication device superimposed on an installation structure at the install location according to the install orientation, etc. In this way, the output 314 may be used to facilitate the installation of the communication device at one or more installation locations.

In some embodiments, the machine learning functionality 308 and/or computer vision functionality 310 employed by the equipment deployment component 301 may be utilized by other components for performing a variety of other tasks. In an example, the machine learning functionality 308 and/or computer vision functionality 310 may be utilized for predictive hardware resource planning and provisioning. The machine learning functionality 308 and/or computer vision functionality 310 may be utilized to determine, deploy, and/or control a number of communication devices, such as repeaters, to deploy for a particular market, region, or parcel, which could be computationally predicted by a computing device. The number of communication devices could then be ordered or reserved, deployed, and/or controlled based upon the set of features 312, ranks assigned to the structures, and/or other scores and building attributes determined using customized functionality of the machine learning functionality 308 and/or computer vision functionality 310. In another example, the machine learning functionality 308 and/or computer vision functionality 310 may be used to generate outputs, such as likelihood ratio test outputs, that may be used to create new artificial intelligence models. These new artificial intelligence models may be used to generate predictions such as to predict a number of units within a parcel (e.g., a number of apartment units within an apartment complex), etc. These new artificial intelligence models may be used to deploy and/or control communication devices.

In another example, the machine learning functionality 308 and/or computer vision functionality 310 may be utilized to rank actions that can be performed by a robot such as a drone. Imagery of an environment where the robot is located (e.g., a 3D map) and/or sensor data detected by the robot (drone) may be evaluated by the machine learning functionality 308 and/or computer vision functionality 310 in order to determine what action the robot should take next. For example, the machine learning functionality 308 and/or computer vision functionality 310 may evaluate the imagery and sensor data collected by the robot in order to detect where the robot is to move so that the robot can perform a particular action of a task for which the robot has been assigned to perform, such as a next installation step during deployment and install of a communication device upon an installation structure by the robot.

In another example, a warehouse robot may want to decide on which box within a warehouse to pack next, such as which box to pack with a communication device for deployment. The warehouse robot may execute the machine learning functionality 308 and/or computer vision functionality 310 to rank boxes based upon proximity of the boxes to the warehouse robot, availability of objects for packing, ease of packing, etc. Once the warehouse robot has used the machine learning functionality 308 and/or computer vision functionality 310 to rank the boxes, the warehouse robot may determine what action to take next (e.g., navigate to a box, pack a box, move on to another box, etc.). In another example, a drone may utilize the machine learning functionality 308 and/or computer vision functionality 310 to decide where to deliver a package, such as where to dispatch, deploy, and/or install a communication device. The drone may know the location of houses where packages of communication devices are to be delivered or installed based upon a high definition map located at an edge of a network to which the drone is connected. The drone may evaluate the high definition map and/or sensor data collected by the drone to rank drop off locations (e.g., doorsteps) based upon clutter (e.g., the more clutter, the more difficult to maneuver), proximity to the drone, proximity of people or animals, obstacles, etc. Once the drop off locations are ranked, the drone can plan a delivery route that is the most efficient for delivering the packages.

According to some embodiments, a method is provided. The method includes evaluating imagery of locations depicting structures within a list of structures to identify features of the structures within the locations; and for each structure within the list of structures: calculating a structure score for the structure based upon a window to building material feature of the structure and a geometric complexity of the structure derived from geometric features of the structure; for each installation structure within a threshold proximity to the structure, calculating an installation score for the installation structure based upon a proximity of the installation structure to the structure and installation structure features indicative of an ability to install a communication device upon the installation structure; calculating a rank for the structure based upon the structure score and the installation scores, wherein the rank corresponds to a predicted capability for the communication device to receive and transmit communication signals into the structure; and in response to the rank for the structure exceeding a threshold, triggering deployment of the communication device for exchanging communication signals with devices proximate the structure.

According to some embodiments, the method includes calculating the geometric complexity based upon a structure complexity score feature derived from a ratio of a surface area of a convex hull encompassing the structure to a footprint surface area of a footprint of the structure.

According to some embodiments, the method includes modifying the structure complexity score feature based upon a fascia size of the structure and a number of corners of the structure.

According to some embodiments, the method includes modifying the structure complexity score feature based upon a number of structure faces of the structure lacking windows.

According to some embodiments, the method includes modifying the structure complexity score feature based upon an interior ring surface area of the structure.

According to some embodiments, the method includes calculating a parcel complexity score feature for a parcel based upon structure complexity score features of structures within the parcel, a density of structures within the parcel, and a number of structures within the parcel; and calculating ranks for the structures within the parcel based upon the parcel complexity score feature.

According to some embodiments, the method includes calculating the window to building material feature as a window to structure material ratio for a structure face of the structure derived from a ratio of window surface area to non-window surface area of the structure face of the structure.

According to some embodiments, the method includes determining a structure face score feature based upon the window to structure material ratio and a structure complexity score feature for the structure derived from a ratio of a surface area of a convex hull encompassing the structure to a footprint surface area of a footprint of the structure; and calculating the rank for the structure based upon the structure face score feature.

According to some embodiments, the method includes determining an area of signal incidence for a structure face of the structure; determining a point within the area of signal incidence that provides a threshold amount of signal coverage to the structure face of the structure; assigning installation features to installation structures within the area of signal incidence based upon proximity of the installation structures to the point; and calculating installation scores for the installation structures within the area of signal incidence based upon the installation features.

According to some embodiments, the method includes determining a first line of sight from a base station to the installation structure; determining a second line of sight from the installation structure to a structure face of the structure; determining a line of sight score feature for the installation structure based upon an amount of obstruction associated with the first line of sight and the second line of sight; and calculating the installation score for the installation structure based upon the line of sight score feature.

According to some embodiments, the method includes identifying external features for inclusion the features of the structures within the locations, wherein the external features comprise at least one of a base station proximity to the structure, a number of floors of the structure, or a height of the structure.

According to some embodiments, the method includes identifying the installation structure features based upon at least one of a height of the installation structure, a material type of the installation structure, high voltage wires proximate the installation structure, a free space on the installation structure for installing the communication device, a first line of sight from the installation structure to a base station, or a second line of sight from the installation structure to a structure face of the structure.

According to some embodiments, the method includes calculating ranks for the structures based upon structure complexity score features, identified courtyards, average floor height features, installation structure proximity features, structure face score features, and installation features derived from area of signal incidence information.

According to some embodiments, a system is provided. The system comprises a processor coupled to memory, the processor configured to execute instructions to perform operations. The operations include evaluating imagery of locations depicting structures within a list of structures to identify features of the structures within the locations; and for each structure within the list of structures: calculating a structure score for the structure based upon a window to building material feature of the structure and a geometric complexity of the structure derived from geometric features of the structure; for each installation structure within a threshold proximity to the structure, calculating an installation score for the installation structure based upon a proximity of the installation structure to the structure and installation structure features indicative of an ability to install a communication device upon the installation structure; calculating a rank for the structure based upon the structure score and the installation scores, wherein the rank corresponds to a predicted capability for the communication device to receive and transmit communication signals into the structure; and controlling the communication device to exchange communication signals with devices proximate the structure based upon the rank exceeding a threshold.

According to some embodiments, the operations include in response to the rank exceeding the threshold, generating a recommendation with an indication that the communication device is capable of self-install by a user.

According to some embodiments, the operations include in response to the rank exceeding the threshold, generating a recommendation with an indication that the communication device is to be installed by a technician.

According to some embodiments, the operations include in response to the rank exceeding the threshold, generating a recommendation with installation instructions for installing the communication device, wherein the installation instructions comprise an install location and an install orientation for the communication device.

According to some embodiments, a non-transitory computer-readable storage medium storing instructions that are executable by one or more processors, is provided. The operations include evaluating imagery of locations depicting structures within a list of structures to identify features of the structures within the locations; and for each structure within the list of structures: calculating a structure score for the structure based upon a window to building material feature of the structure and a geometric complexity of the structure derived from geometric features of the structure; for each installation structure within a threshold proximity to the structure, calculating an installation score for the installation structure based upon a proximity of the installation structure to the structure and installation structure features indicative of an ability to install a communication device upon the installation structure; calculating a rank for the structure based upon the structure score and the installation scores, wherein the rank corresponds to a predicted capability for the communication device to receive and transmit communication signals into the structure; and in response to the rank for the structure exceeding a threshold, triggering dispatch of the communication device for exchanging communication signals with devices proximate the structure.

According to some embodiments, the operations include in response to the rank exceeding the threshold, transmitting a recommendation to a user device to guide a user through an installation process to install the communication device.

According to some embodiments, wherein the recommendation comprises installation instructions specifying an install location and an install orientation for the communication device.

Figure 10:
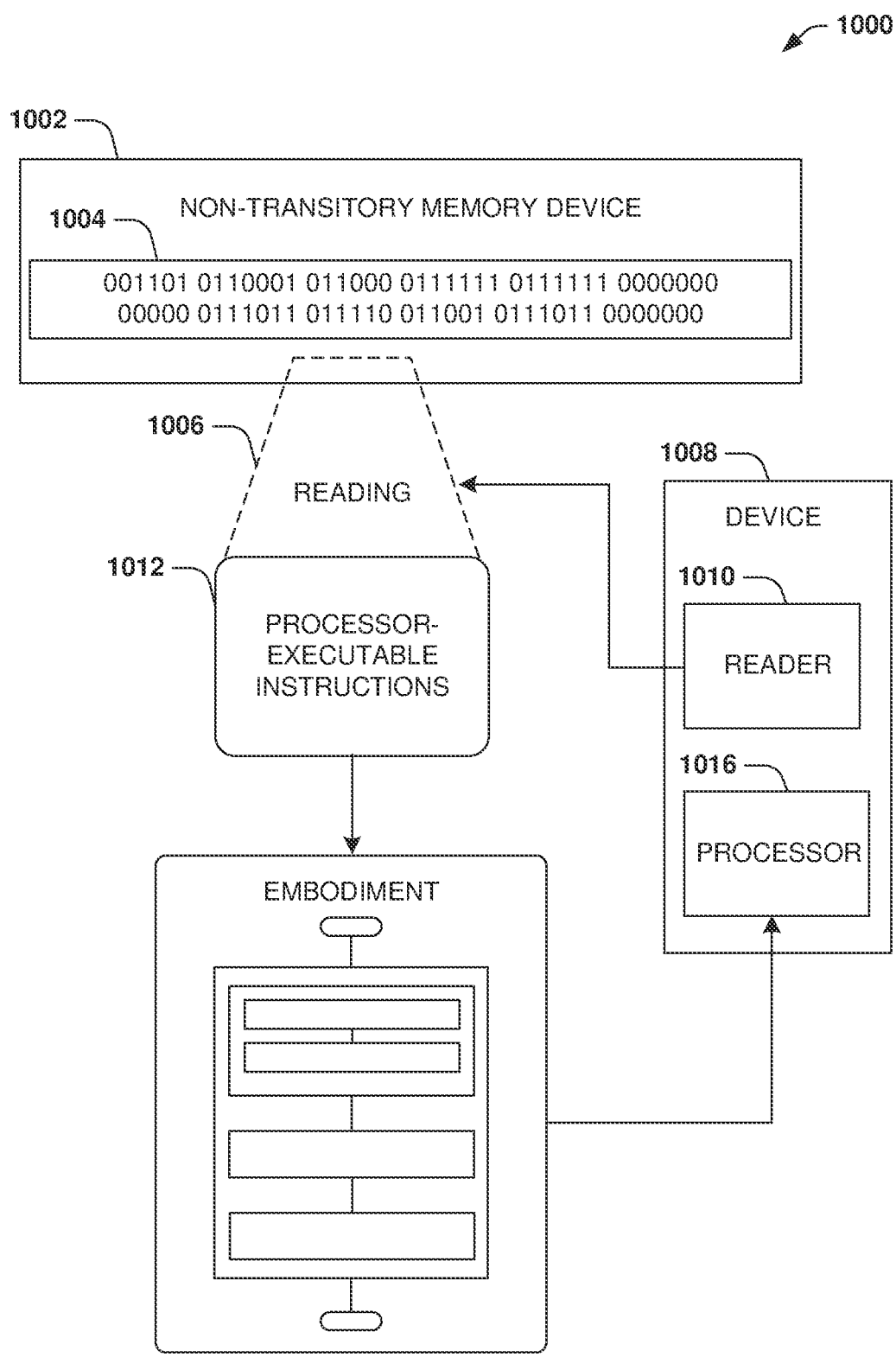
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 200 of FIG. 2, for example. In some embodiments, the processor-executable instructions 1012 are configured to cause implementation of a system, such as at least some of the example system 900 of FIG. 9, for example.

Figure 11:
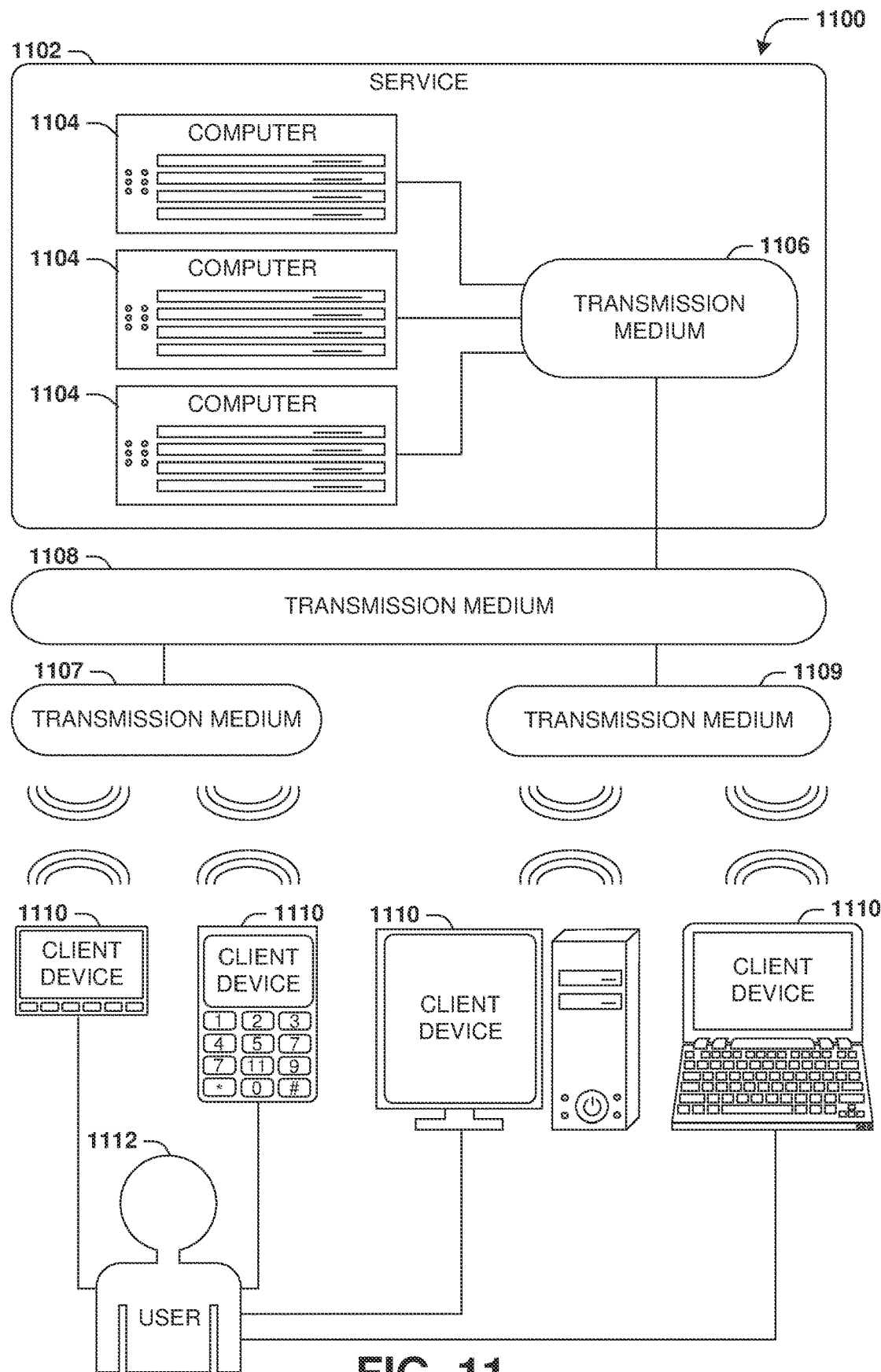
FIG. 11 is an illustration of example networks that may utilize and/or implement at least a portion of the techniques presented herein.

FIG. 11 is an interaction diagram of a scenario 1100 illustrating a service 1102 provided by a set of computers 1104 to a set of client devices 1110 via various types of transmission mediums. The computers 1104 and/or client devices 1110 may be capable of transmitting, receiving, processing, and/or storing many types of signals, such as in memory as physical memory states.

The computers 1104 of the service 1102 may be communicatively coupled together, such as for exchange of communications using a transmission medium 1106. The transmission medium 1106 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 1102.

Likewise, the transmission medium 1106 may comprise one or more sub-networks, such as may employ different architectures, may be compliant or compatible with differing protocols and/or may interoperate within the transmission medium 1106. Additionally, various types of transmission medium 1106 may be interconnected (e.g., a router may provide a link between otherwise separate and independent transmission medium 1106).

In scenario 1100 of FIG. 11, the transmission medium 1106 of the service 1102 is connected to a transmission medium 1108 that allows the service 1102 to exchange data with other services 1102 and/or client devices 1110. The transmission medium 1108 may encompass various combinations of devices with varying levels of distribution and exposure, such as a public wide-area network and/or a private network (e.g., a virtual private network (VPN) of a distributed enterprise).

In the scenario 1100 of FIG. 11, the service 1102 may be accessed via the transmission medium 1108 by a user 1112 of one or more client devices 1110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 1110 may communicate with the service 1102 via various communicative couplings to the transmission medium 1108. As a first such example, one or more client devices 1110 may comprise a cellular communicator and may communicate with the service 1102 by connecting to the transmission medium 1108 via a transmission medium 1107 provided by a cellular provider. As a second such example, one or more client devices 1110 may communicate with the service 1102 by connecting to the transmission medium 1108 via a transmission medium 1109 provided by a location such as the user's home or workplace (e.g., a WiFi (Institute of Electrical and Electronics Engineers (IEEE) Standard 1102.11) network or a Bluetooth (IEEE Standard 1102.15.1) personal area network). In this manner, the computers 1104 and the client devices 1110 may communicate over various types of transmission mediums.

Figure 12:
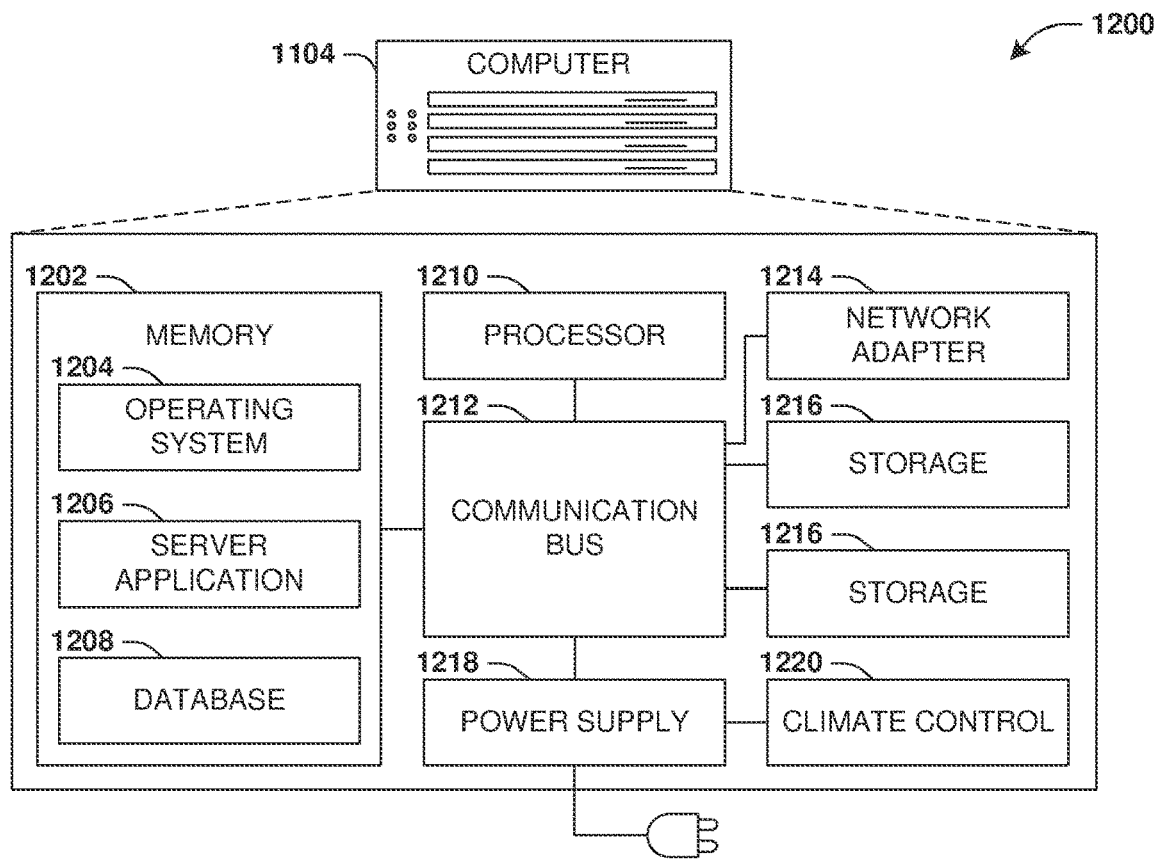
FIG. 12 is an illustration of a scenario involving an example configuration of a computer that may utilize and/or implement at least a portion of the techniques presented herein.

FIG. 12 presents a schematic architecture diagram 1200 of a computer 1104 that may utilize at least a portion of the techniques provided herein. Such a computer 1104 may vary widely in configuration or capabilities, alone or in conjunction with other computers, in order to provide a service such as the service 1102.

The computer 1104 may comprise one or more processors 1210 that process instructions. The one or more processors 1210 may optionally include a plurality of cores; one or more coprocessors, such as a mathematics coprocessor or an integrated graphical processing unit (GPU); and/or one or more layers of local cache memory. The computer 1104 may comprise memory 1202 storing various forms of applications, such as an operating system 1204; one or more computer applications 1206; and/or various forms of data, such as a database 1208 or a file system. The computer 1104 may comprise a variety of peripheral components, such as a wired and/or wireless network adapter 1214 connectible to a local area network and/or wide area network; one or more storage components 1216, such as a hard disk drive, a solid-state storage device (SSD), a flash memory device, and/or a magnetic and/or optical disk reader.

The computer 1104 may comprise a mainboard featuring one or more communication buses 1212 that interconnect the processor 1210, the memory 1202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 1212 may interconnect the computer 1104 with at least one other computer. Other components that may optionally be included with the computer 1104 (though not shown in the schematic architecture diagram 1200 of FIG. 12) include a display; a display adapter, such as a graphical processing unit (GPU); input peripherals, such as a keyboard and/or mouse; and a flash memory device that may store a basic input/output system (BIOS) routine that facilitates booting the computer 1104 to a state of readiness.

The computer 1104 may operate in various physical enclosures, such as a desktop or tower, and/or may be integrated with a display as an "all-in-one" device. The computer 1104 may be mounted horizontally and/or in a cabinet or rack, and/or may simply comprise an interconnected set of components. The computer 1104 may comprise a dedicated and/or shared power supply 1218 that supplies and/or regulates power for the other components. The computer 1104 may provide power to and/or receive power from another computer and/or other devices. The computer 1104 may comprise a shared and/or dedicated climate control unit 1220 that regulates climate properties, such as temperature, humidity, and/or airflow. Many such computers 1104 may be configured and/or adapted to utilize at least a portion of the techniques presented herein.

Figure 13:
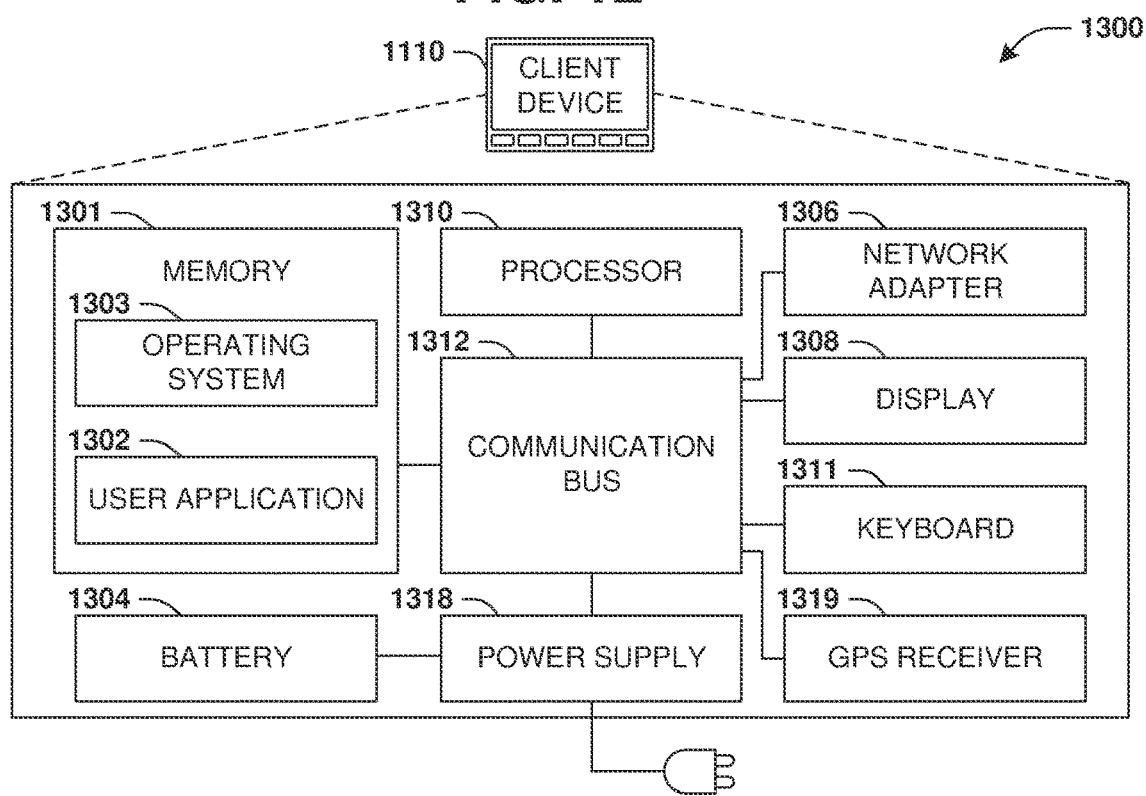
FIG. 13 is an illustration of a scenario involving an example configuration of a client that may utilize and/or implement at least a portion of the techniques presented herein.

FIG. 13 presents a schematic architecture diagram 1300 of a client device 1110 whereupon at least a portion of the techniques presented herein may be implemented. Such a client device 1110 may vary widely in configuration or capabilities, in order to provide a variety of functionality to a user such as the user 1112. The client device 1110 may be provided in a variety of form factors, such as a desktop or tower workstation; an "all-in-one" device integrated with a display 1308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 1110 may serve the user in a variety of roles, such as a workstation, kiosk, media player, gaming device, and/or appliance.

The client device 1110 may comprise one or more processors 1310 that process instructions. The one or more processors 1310 may optionally include a plurality of cores; one or more coprocessors, such as a mathematics coprocessor or an integrated graphical processing unit (GPU); and/or one or more layers of local cache memory. The client device 1110 may comprise memory 1301 storing various forms of applications, such as an operating system 1303; one or more user applications 1302, such as document applications, media applications, file and/or data access applications, communication applications such as web browsers and/or email clients, utilities, and/or games; and/or drivers for various peripherals. The client device 1110 may comprise a variety of peripheral components, such as a wired and/or wireless network adapter 1306 connectible to a local area network and/or wide area network; one or more output components, such as a display 1308 coupled with a display adapter (optionally including a graphical processing unit (GPU)), a sound adapter coupled with a speaker, and/or a printer; input devices for receiving input from the user, such as a keyboard 1311, a mouse, a microphone, a camera, and/or a touch-sensitive component of the display 1308; and/or environmental sensors, such as a global positioning system (GPS) receiver 1319 that detects the location, velocity, and/or acceleration of the client device 1110, a compass, accelerometer, and/or gyroscope that detects a physical orientation of the client device 1110. Other components that may optionally be included with the client device 1110 (though not shown in the schematic architecture diagram 1300 of FIG. 13) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 1110 to a state of readiness; and a climate control unit that regulates climate properties, such as temperature, humidity, and airflow.

The client device 1110 may comprise a mainboard featuring one or more communication buses 1312 that interconnect the processor 1310, the memory 1301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 1110 may comprise a dedicated and/or shared power supply 1318 that supplies and/or regulates power for other components, and/or a battery 1304 that stores power for use while the client device 1110 is not connected to a power source via the power supply 1318. The client device 1110 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    evaluating imagery of locations depicting structures within a list of structures to identify features of the structures within the locations; and
    for each structure within the list of structures:
        calculating a structure score for the structure based upon a window to building material feature of the structure and a geometric complexity of the structure derived from geometric features of the structure;
        for each installation structure within a threshold proximity to the structure, calculating an installation score for the installation structure based upon a proximity of the installation structure to the structure and installation structure features indicative of an ability to install a communication device upon the installation structure;
        calculating a rank for the structure based upon the structure score and the installation scores, wherein the rank corresponds to a predicted capability for the communication device to receive and transmit communication signals into the structure; and
        in response to the rank for the structure exceeding a threshold, triggering deployment of the communication device for exchanging communication signals with devices proximate the structure.

2. The method of claim 1, comprising:
    calculating the geometric complexity based upon a structure complexity score feature derived from a ratio of a surface area of a convex hull encompassing the structure to a footprint surface area of a footprint of the structure.

3. The method of claim 2, comprising:
modifying the structure complexity score feature based upon a fascia size of the structure and a number of corners of the structure.

4. The method of claim 2, comprising:
modifying the structure complexity score feature based upon a number of structure faces of the structure.

5. The method of claim 2, comprising:
modifying the structure complexity score feature based upon an interior ring surface area of the structure.

6. The method of claim 1, comprising:
calculating a parcel complexity score feature for a parcel based upon structure complexity score features of structures within the parcel, a density of structures within the parcel, and a number of structures within the parcel; and
calculating ranks for the structures within the parcel based upon the parcel complexity score feature.

7. The method of claim 1, comprising:
calculating the window to building material feature as a window to structure material ratio for a structure face of the structure derived from a ratio of window surface area to non-window surface area of the structure face of the structure.

8. The method of claim 7, comprising:
determining a structure face score feature based upon the window to structure material ratio and a structure complexity score feature for the structure derived from a ratio of a surface area of a convex hull encompassing the structure to a footprint surface area of a footprint of the structure; and
calculating the rank for the structure based upon the structure face score feature.

9. The method of claim 1, comprising:
determining an area of signal incidence for a structure face of the structure;
determining a point within the area of signal incidence that provides a threshold amount of signal coverage to the structure face of the structure;
assigning installation features to installation structures within the area of signal incidence based upon proximity of the installation structures to the point; and
calculating installation scores for the installation structures within the area of signal incidence based upon the installation features.

10. The method of claim 1, comprising:
determining a first line of sight from a base station to the installation structure;
determining a second line of sight from the installation structure to a structure face of the structure;
determining a line of sight score feature for the installation structure based upon an amount of obstruction associated with the first line of sight and the second line of sight; and
calculating the installation score for the installation structure based upon the line of sight score feature.

11. The method of claim 1, wherein the features comprise external features corresponding to at least one of a base station proximity to the structure, a number of floors of the structure, or a height of the structure.

12. The method of claim 1, comprising:
identifying the installation structure features based upon at least one of a height of the installation structure, a material type of the installation structure, high voltage wires proximate the installation structure, a free space on the installation structure for installing the communication device, a first line of sight from the installation structure to a base station, or a second line of sight from the installation structure to a structure face of the structure.

13. The method of claim 1, comprising:
calculating ranks for the structures based upon structure complexity score features, identified courtyards, average floor height features, installation structure proximity features, structure face score features, and installation features derived from area of signal incidence information.

14. A system comprising:
a memory comprising instructions; and
a processor coupled to the memory, the processor configured to execute the instructions to facilitate performance of operations comprising:
evaluating imagery of locations depicting structures within a list of structures to identify features of the structures within the locations; and
for each structure within the list of structures:
calculating a structure score for the structure based upon a window to building material feature of the structure and a geometric complexity of the structure derived from geometric features of the structure;
for each installation structure within a threshold proximity to the structure, calculating an installation score for the installation structure based upon a proximity of the installation structure to the structure and installation structure features indicative of an ability to install a communication device upon the installation structure;
calculating a rank for the structure based upon the structure score and the installation scores, wherein the rank corresponds to a predicted capability for the communication device to receive and transmit communication signals into the structure; and
controlling the communication device to exchange communication signals with devices proximate the structure based upon the rank exceeding a threshold.

15. The system of claim 14, wherein the operations comprise:
in response to the rank exceeding the threshold, generating a recommendation with an indication that the communication device is capable of self-install by a user.

16. The system of claim 14, wherein the operations comprise:
in response to the rank exceeding the threshold, generating a recommendation with an indication that the communication device is to be installed by a technician.

17. The system of claim 14, wherein the operations comprise:
in response to the rank exceeding the threshold, generating a recommendation with installation instructions for installing the communication device, wherein the installation instructions comprise an install location and an install orientation for the communication device.

18. A non-transitory computer-readable storage medium storing instructions that are executable by one or more processors, the instructions comprising:
evaluating imagery of locations depicting structures within a list of structures to identify features of the structures within the locations; and
for each structure within the list of structures:
calculating a structure score for the structure based upon a window to building material feature of the structure and a geometric complexity of the structure derived from geometric features of the structure;

for each installation structure within a threshold proximity to the structure, calculating an installation score for the installation structure based upon a proximity of the installation structure to the structure and installation structure features indicative of an ability to install a communication device upon the installation structure;

calculating a rank for the structure based upon the structure score and the installation scores, wherein the rank corresponds to a predicted capability for the communication device to receive and transmit communication signals into the structure; and in response to the rank for the structure exceeding a threshold, triggering dispatch of the communication device for exchanging communication signals with devices proximate the structure.

19. The non-transitory computer-readable storage medium of claim 18, wherein the instructions comprise:

in response to the rank exceeding the threshold, transmitting a recommendation to a user device to guide a user through an installation process to install the communication device.

20. The non-transitory computer-readable storage medium of claim 19, wherein the recommendation comprises installation instructions specifying an install location and an install orientation for the communication device.

* * * * *